US008520854B2

(12) United States Patent
Schneider (10) Patent No.: US 8,520,854 B2
(45) Date of Patent: *Aug. 27, 2013

(54) SHARING A SECRET USING POLYNOMIALS OVER POLYNOMIALS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1394 days.

This patent is subject to a terminal disclaimer.

(21) Appl. No.: 12/200,895

(22) Filed: Aug. 28, 2008

(65) Prior Publication Data

US 2010/0054480 A1    Mar. 4, 2010

(51) Int. Cl.
*H04L 29/06* (2006.01)
(52) U.S. Cl.
USPC ............................................ 380/277; 380/44
(58) Field of Classification Search
USPC .................................. 380/277–286, 44–47
See application file for complete search history.

(56) References Cited

U.S. PATENT DOCUMENTS

| 4,037,093 | A | 7/1977 | Gregg et al. | |
|---|---|---|---|---|
| 5,379,243 | A * | 1/1995 | Greenberger et al. | 708/492 |
| 7,167,565 | B2 | 1/2007 | Rajasekaran | |
| 7,995,764 | B2 | 8/2011 | Schneider | |
| 7,995,765 | B2 | 8/2011 | Schneider | |
| 2002/0032866 | A1 | 3/2002 | Suga | |
| 2003/0081785 | A1 | 5/2003 | Boneh et al. | |
| 2004/0025018 | A1 | 2/2004 | Haas et al. | |
| 2004/0071293 | A1* | 4/2004 | Yamamichi et al. | 380/277 |
| 2004/0076291 | A1* | 4/2004 | Geiringer | 380/28 |
| 2004/0103276 | A1 | 5/2004 | Jing et al. | |
| 2004/0179686 | A1 | 9/2004 | Matsumura et al. | |
| 2005/0053045 | A1 | 3/2005 | Chmora et al. | |
| 2008/0232580 | A1 | 9/2008 | Hosaka et al. | |
| 2009/0144543 | A1 | 6/2009 | Fujii et al. | |
| 2010/0008505 | A1 | 1/2010 | Bai | |

FOREIGN PATENT DOCUMENTS

JP    2008233823    10/2008

OTHER PUBLICATIONS

USPTO, Notice of Allowance for U.S. Appl. No. 12/200,896 mailed Apr. 20, 2011.
USPTO, Office Action for U.S. Appl. No. 12/200,896 mailed Jan. 24, 2011.
USPTO, Notice of Allowance for U.S. Appl. No. 12/200,897 mailed Mar. 31, 2011.
USPTO, Office Action for U.S. Appl. No. 12/200,897 mailed Jan. 25, 2011.
Asmuth, Charles et al., "A Modular Approach to Key Safeguarding", *IEEE Transactions on Information Theory*, vol. IT-29, No. 2, Mar. 1983, pp. 208-210.

(Continued)

*Primary Examiner* — Lisa Lewis
(74) *Attorney, Agent, or Firm* — Lowenstein Sandler LLP (57) ABSTRACT

A method and system distributes N shares of a secret among cooperating entities by representing the secret as a secret polynomial, and forming a splitting polynomial with the secret polynomial as one or more of the coefficients. In one embodiment, the method represents the secret as a secret polynomial over $GF(q)$, where q is a prime number or a power of a prime number. A splitting polynomial of degree $(K-1)$ over $GF(q^m)$ is constructed, where K is the number of shares to reconstruct the secret and m is a positive integer. The coefficients of the splitting polynomial are formed with the secret polynomial and random information. The method further evaluates the splitting polynomial at N points with arithmetic defined on $GF(q^m)$ to generate the N shares of the secret.

16 Claims, 5 Drawing Sheets

SECRET SHARING

(56) References Cited

OTHER PUBLICATIONS

Blakley, G. R. et al., "Safeguarding Cryptographic Keys", *National Computer Conference*, 1979, AFIPS—Conference Proceedings, vol. 48, AFIPS Press, Montvale, NJ 07645, pp. 313-317.

Blakley, G. R. et al., "Security of Ramp Schemes", *Lecture Notes in Computer Science—Advances in Cryptology*, Proceedings of CRYPTO 84, Springer-Verlag, pp. 242-268.

Shamir, Adi et al., "How to Share a Secret", *Programming Techniques*, Communications of the ACM, Nov. 1979, vol. 22, No. 11, pp. 612-613.

Schneier, Bruce, "Applied Cryptography, Second Edition—Protocols, Algorithms and Source Code in C", © 1996, John Wiley & Sons, Inc., title pages, pp. viii and 47-74.

Wang et al., "Secret image sharing with smaller shadow images"; Pattern Recognition Letters, vol. 27, issue 6, Apr. 15, 2006, pp. 551-555.

USPTO, Office Action for U.S. Appl. No. 11/978,768 mailed Sep. 28, 2010.

USPTO, Office Action for U.S. Appl. No. 11/978,768 mailed Mar. 15, 2011.

USPTO, Notice of Allowance for U.S. Appl. No. 11/978,768 mailed Apr. 24, 2012.

* cited by examiner

SHARING A SECRET USING POLYNOMIALS OVER POLYNOMIALS

TECHNICAL FIELD

Embodiments of the present invention relate to cryptographic techniques, and more specifically, to sharing a secret among cooperating parties.

CROSS-REFERENCE TO RELATED APPLICATIONS

The present application is related to co-filed patent application Ser. Nos. 12/200,896 and 12/200,897, both filed Aug. 28, 2008, which are assigned to the same assignee as the present application.

BACKGROUND

In cryptography, secret sharing refers to any method for distributing a secret among a group of participants, each of which is allocated one or more shares of the secret. The secret can only be reconstructed when a required number of shares are combined together; individual shares are of no use on their own.

A secure secret sharing scheme distributes shares so that anyone with fewer than the required shares has no extra information about the secret than someone with zero shares. Some secret sharing schemes allow the secret to be reconstructed by a subset of the total number of generated shares. Thus, a secret can be reconstructed even when some of the share are lost or when some of the share holders are absent.

In general, known secret sharing techniques are defined in the integer ring, which involve manipulation of integers of large sizes. Large integers are not suitable for computer operations. Thus, there is a need to develop a secret sharing technique that overcomes the above inherent limitation of the known techniques.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system distributes N shares of a secret among cooperating entities by representing the secret as a secret polynomial, and forming a splitting polynomial with the secret polynomial as one or more of the coefficients. In one embodiment, the method represents the secret as a secret polynomial over $GF(q)$, where q is a prime number or a power of a prime number. A splitting polynomial of degree $(K-1)$ over $GF(q^m)$ is constructed, where K is the number of shares to reconstruct the secret and m is a positive integer. The coefficients of the splitting polynomial are formed with the secret polynomial and random information. The method further evaluates the splitting polynomial at N points with arithmetic defined on $GF(q^m)$ to generate the N shares of the secret.

An exemplary use of the secret sharing technique is a multi-factor key escrow system, where shares from a master key are given to a set of federated entities such that a subset of these shares can be used to reconstruct the master key. For example, an employee of a company in a high-security position (e.g., a corporate controller, or a human resources specialist) may have a master password that protects a secret key they need to use to authenticate on their corporate workstation. Ordinarily, this master key is only used by this employee. However, if something were to happen to this employee, his/her replacement would need to be able to gain access to this master key. As the master key provides its owner access to sensitive data, the company cannot just give a backup copy of the master key to someone for safe keeping (e.g., it would be disastrous if a disgruntled employee was able to cut himself a million dollar severance check). Thus, the master key can be split up into multiple shares, so that a share is held by each of several trusted employees. A minimum number of these trusted employees would need to present their shares and reconstruct the secret (i.e., the master key). Illustratively, one share may go to the employee's boss, and other shares may be distributed to other department heads or managers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "representing", "constructing", "generating", "using", "splitting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
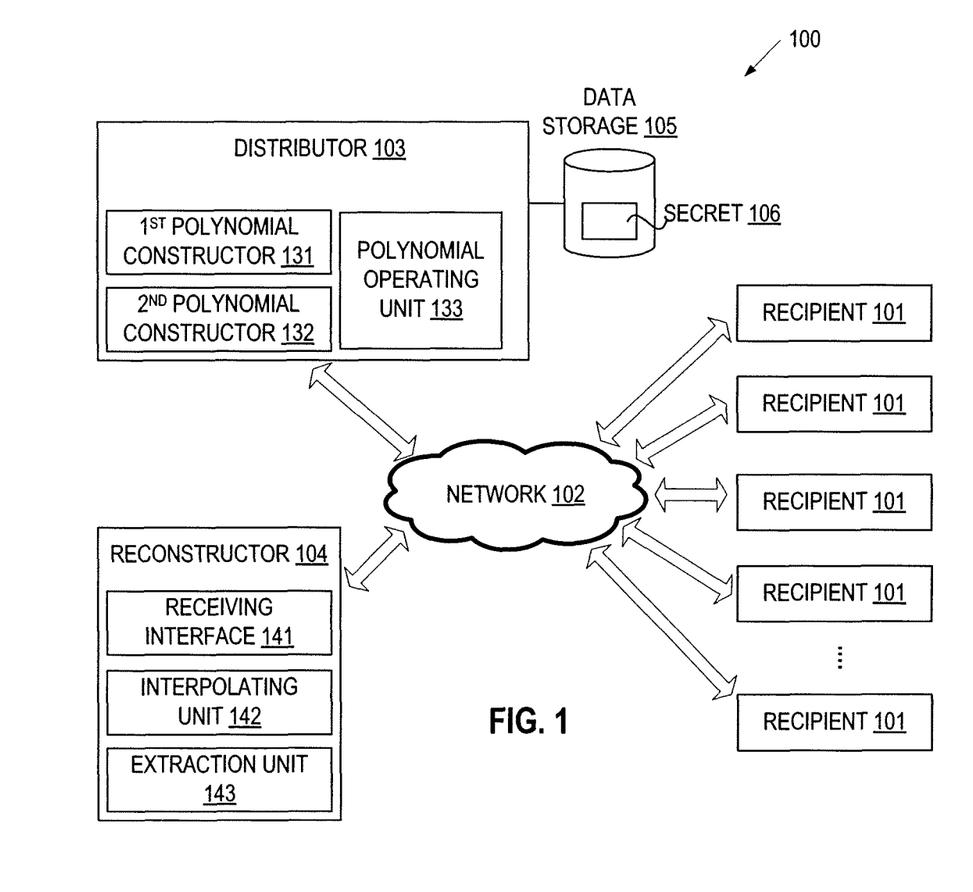
FIG. 1 illustrates a network architecture in which embodiments of the present invention may be implemented.

FIG. 1 illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a Local Area Network (LAN)). In one embodiment, each of the distributor 103 and recipients 101 is a computing system that manages secret information. Alternatively, the distributor 103 may be a computing system and each recipient 101 may be a storage device for receiving and storing one or more shares of a secret. The distributor 103 is locally coupled to data storage 105 in which a secret 106 is stored. Data storage 105 may include one or more storage devices (e.g., the computer-readable medium described above) that are local to the distributor 103 and/or remote from the distributor 103. In alternative embodiments, the secret 106 may be stored in the main memory of the distributor 103. In one embodiment, the secret 106 may be a cryptographic key, a password, or any secret data to be jointly held in escrow by the recipients 101.

The secret 106 may be a number, a bit string, an ASCII coded text or other representations that can be converted into a sequence of numbers, with each number an element of GF(q), where q is a prime number or a positive power of a prime number. In polynomial notation, such a number sequence can be represented as a polynomial having m coefficients in GF(q). The polynomial representing the secret is herein referred to as a "secret polynomial" over GF(q). The degree of the secret polynomial is selected to be large enough to represent the secret 106, e.g., at least as large as the length of the sequence of numbers that represents the secret 106. For example, if the secret is a 256-bit bulk cipher key, and q=89, the degree of the secret polynomial is at least 40, and the 256-bit secret can be represented as a $39^{th}$ degree secret polynomial with coefficients in GF(89).

According to one embodiment of the present invention, coefficients of the secret polynomial over GF(q) can be combined with random information to construct another polynomial (referred as a "splitting polynomial") over $GF(q^m)$. The order of the field $GF(q^m)$ (i.e., the number of elements in the field), which is $q^m$, can be any prime power that is large enough to provide the necessary coefficients for the splitting polynomial. To avoid the possibility of a brute force attack, the order of the field is generally chosen to be larger than the number of allowable secrets. Thus, for a 256-bit secret and q=89, m is generally chosen to be 40 or larger. However, it is understood that the mathematics work with a smaller field (e.g., m<40 for q=89) and the operations will be faster, at the cost of some security. The generation of the splitting polynomial will be described in greater detail with reference to FIGS. 2 and 3.

The security implication of using a smaller field can be explained as follows. Assume that an attacker has all but one of the required shares for reconstruction. The attacker can attempt to "guess" the value of a missing share by picking an element from the field $GF(q^m)$ as the evaluation point, and then reconstructing the secret with every possible value from $GF(q^m)$ as the result. This is a work factor of $q^m$—if this is smaller than the size of the set of all possible secrets, it is faster than a straight brute-force attack against the secret directly. In other words, if a 256-bit secret is to be shared in a (4, 3) scheme using $GF(89^m)$, and if the smallest possible m (=14) is chosen, an attacker in possession of two shares only needs to try $89^{14}$ different combinations ($89^{14} < 2^{91} < 2^{256}$). An attacker with even a single share in this example is still better off than just trying to guess the secret directly—the complexity of a single share reconstruction is $89^{28}$, which is less than $2^{182}$.

To safeguard the secret 106, the distributor 103 generates a plurality of shares of the secret 106 and distributes one or more shares to each of the recipients 101 through the network 102. The secret 106 can be reconstructed from a subset of the distributed shares. In one embodiment, the cryptosystem 100 also includes a reconstructor 104 to reconstruct the secret 106 using the distributed shares. The reconstructor 104 collects the received shares of the secret to form interpolating polynomials, and linearly combines the interpolating polynomials to recover the splitting polynomial. The original secret can be extracted from the splitting polynomial. A person of ordinary skill in the art would appreciate that the reconstructor 104 may be a separate computing system as shown in FIG. 1, or, alternatively, may reside in the same computing system as the distributor 103 or any of the recipients 101. In one embodiment, the distributor 103, the recipients 101 and/or the reconstructor 104 may be, for example, servers, personal computers (PCs), mobile phones, palm-sized computing devices, personal digital assistants (PDAs), or the like.

In one embodiment, the distributor 103 includes a first polynomial constructor 131, a second polynomial constructor 132, and a polynomial operating unit 133 to generate the shares. The reconstructor 104 includes a receiving interface 141 to collect shares of the secret 106 from the recipients 101, an interpolating unit 142 to reconstruct a splitting polynomial from the collected shares, and an extraction unit 143 to extract the secret from the splitting polynomial. Each of the first polynomial constructor 131, the second polynomial constructor 132, the polynomial operating unit 133, the interpolating unit 142, and the extraction unit 143 includes arithmetic processing units, such as adders, multipliers, random element generators, subtractors, dividers, etc., as well as memory circuitry, such as registers, RAM, etc., to perform mathematical calculations. The operations of these components will be described in greater detail below in connection with FIGS. 2-4.

In one embodiment, the distributor 103 distributes the shares of the secret to the recipients 101 using a transport-safe coding. An embodiment of the transport-safe coding transcodes (converts) the input to elements of a finite field GF(q) (where q is a prime number or a power of a prime number), in which operations of a cryptographic algorithm (e.g., secret sharing) is performed. The result of the cryptographic algorithm, which contains elements of GF(q), can be mapped directly to a transport-safe code for transporting via a communication protocol that is not safe for transporting binary values. For example, the input data stream can be transcoded into a polynomial over GF(67) if the subsequent cryptographic algorithm operates over GF($67^m$). After the cryptographic function is performed, the output (which is still a set of integers in the range 0-66) can be mapped into a transport character set of 67 characters. By contrast, if a standard transport coding (e.g., base-64) is used, additional conversions would be needed for transmission (as well as reception) of the data stream. With base-64 coding, the input would first have to be transcoded to a polynomial over GF(67) for the cryptographic operations. The result of the cryptographic operations would have to be converted back to a binary form, which is then transcoded to base 64 for transport.

In one embodiment where the output data stream consists of a sequence of elements from a set of q printable characters, the base q may be a prime number or a power of a prime less than 94, e.g., q may be any of the following numbers: 2, 3, 4, 5, 7, 8, 9, 11, 13, 16, 17, 19, 23, 25, 27, 29, 31, 32, 37, 41, 43, 47, 49, 53, 59, 61, 64, 67, 71, 73, 79, 81, 83, and 89. The number 94 comes from the fact that there are 94 printable characters (such as, for example, ASCII characters). With an appropriate choice of the base q, the index values generated in the transport-safe coding can be used as the coefficients of a polynomial that represents the secret over GF(q), and the shares (containing elements of GF(q)) generated from the secret can be directly used for transport. Thus, when the secret sharing is used in tandem with the transport-safe coding, the prime number or prime power q that constructs GF(q) for secret sharing is often chosen to be the same as the base q for the transport-safe coding. However, it is understood that the secret sharing described herein does not need to be combined with transport-safe coding.

Figure 2:
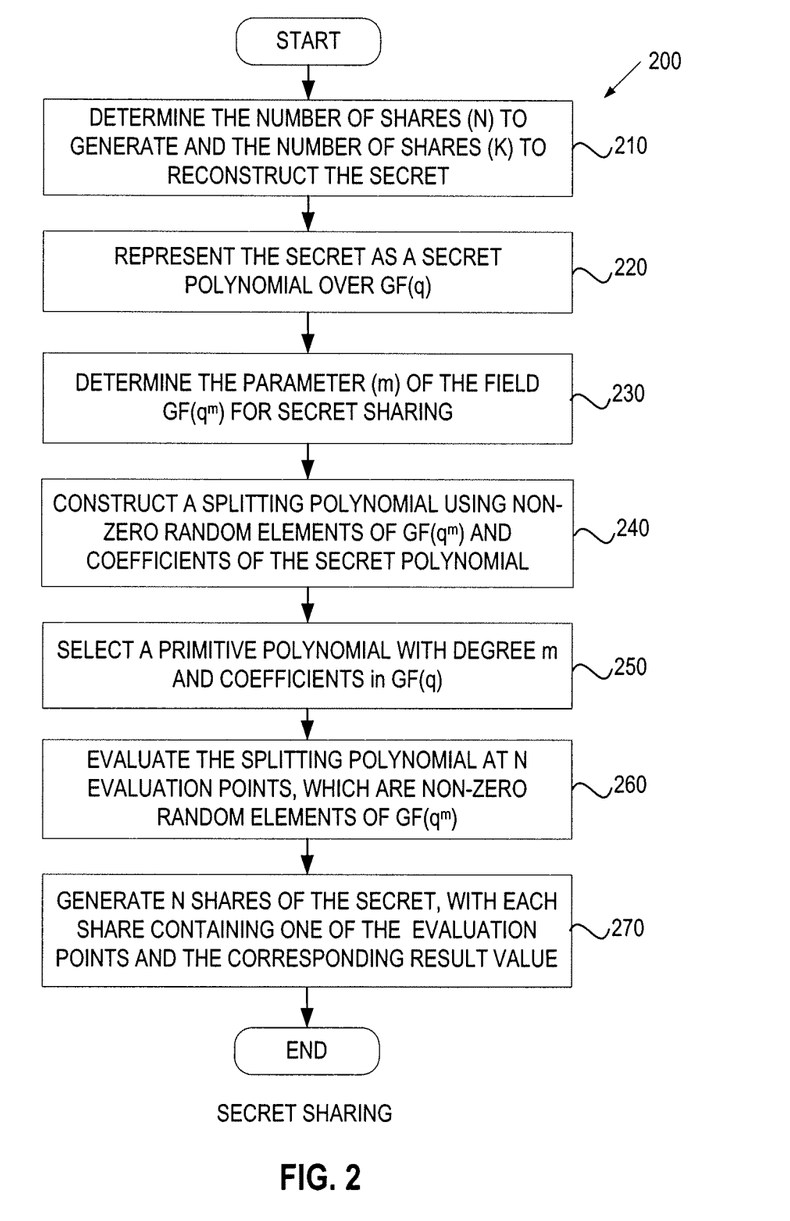
FIG. 2 is a flow diagram of a secret sharing method according to one embodiment of the present invention.

FIG. 2 illustrates a flow diagram of one embodiment of a method 200 for generating a plurality of shares from a secret (e.g., the secret 106). The method 200 may be performed by the processing logic 526 of FIG. 5 that may comprise hardware (e.g., circuitry, dedicated logic, programmable logic, microcode, etc.), software (such as instructions on a computer readable storage medium executable by a processing device), or a combination thereof. In one embodiment, the method 200 is performed by the distributor 103 of FIG. 1.

Referring to FIG. 2, at block 210, the method 200 begins with the distributor 103 determining the total number (N) of shares to be generated and the number (K) of shares for reconstruction. Alternatively, the determination may be made by a user or an administrator of the distributor 103, based on the available computing or storage resources and the available number of recipients 101 that can jointly hold the shares of the secret. At block 220, if the secret is stored in a format other than an element of GF(q), the distributor 103 converts the secret into an element of GF(q). The first polynomial constructor 131 of the distributor 103 converts the secret into a secret polynomial=$c_d x^d + \ldots + c_2 x^2 + c_1 x + c_0$. Each of the coefficients in the sequence ($c_d, \ldots, c_1, c_0$) is an integer in the range of (0, q−1). The secret can be converted from its original format to the sequence of coefficients by a number of different techniques. For example, if the original secret is a decimal number, the sequence of coefficients ($c_d, \ldots, c_1, c_0$) can be generated by repeatedly dividing the secret by q and retaining the reminders and the last quotient. If the original secret is a binary bit string, the sequence of coefficients ($c_d, \ldots, c_1, c_0$) can be generated by converting consecutive subsequences of the secret bit string individually. Illustratively, if q is 67, each 6 bits of the secret bit string can be grouped together to produce a coefficient that is less than 67. If p is 89, each 32 bits of the secret bit string can be grouped together to produce 5 elements of the output at a time (e.g., by repeatedly dividing the 32-bit value by 89 and retaining the remainders).

At block 230, the distributor 103 determines the parameter m for the field GF($q^m$), over which a splitting polynomial for the secret is to be constructed. In one embodiment, m is chosen such that the field of characteristics q is large enough to represent the largest secret. For a secret that is represented as ($c_d, \ldots, c_1, c_0$), m is chosen at least as large as (d+1). For a 256-bit secret and q=89, m is chosen to be 40 or larger. The determination of the parameter m may alternatively be performed by a system administrator based on the size of the secret, the available computing resources, the desired computing speed, and the security requirements. To achieve faster computing speed, m may be chosen to be smaller than (d+1) at the expense of reduced security.

At block 240, the second polynomial constructor 132 of the distributor 103 constructs a splitting polynomial over GF($q^m$) of degree (K−1), using the secret polynomial computed at block 230 and additional random elements of GF($q^m$). In an embodiment, the splitting polynomial may be constructed as: $A_{k-1} Y^{k-1} + A_{k-2} + \ldots + A_1 Y + A_0$, where the secret polynomial ($c_d x^d + \ldots + c_2 x^2 + c_1 x + c_0$) is used as one of the coefficients for the splitting polynomial (e.g., $A_0$). The other coefficients are generated as random elements of GF($q^m$). In alternative embodiments, the coefficients ($c_d, \ldots, c_1, c_0$) of the secret polynomial may be split between two or more terms of the splitting polynomial. As an example, assume that d=3 and m is chosen to be 2. The coefficients of the above splitting polynomial may be chosen as: $A_1=(c_3 x + c_2)$, $A_0=(c_1 x + c_0)$, and $A_3$ and $A_2$ being random elements of GF($q^2$). The mapping from $A_i$ to $C_i$ may be different from what is shown in the above examples. For example, instead of mapping the secret to lower degree terms of the splitting polynomial, the secret may be mapped to one or more higher degree terms of the splitting polynomial. An alternative method for constructing a splitting polynomial is described with reference to FIG. 3.

Continuing to block 250, the distributor 103 selects a primitive polynomial over GF(q) of degree m. A primitive polynomial over GF(q) of degree m is a polynomial with coefficients from GF(q) and roots in GF($q^m$), where each root is a primitive element of GF($q^m$). Such polynomials have characteristic properties that allow them to be identified (e.g., for a polynomial Pr of degree m, the smallest integer n that makes $x^n=1$ (modulo Pr) true is $q^m-1$). The primitive polynomial can be used to construct a representation of the field $GF(q^m)$. The primitive polynomial will be used to perform modulo operations during the generation of shares.

Continuing to block 260, the polynomial operating unit 133 of the distributor 103 evaluates the splitting polynomial at N evaluation points, which are random elements of $GF(q^m)$. The evaluation is performed by arithmetic logic circuits of the polynomial operating unit 133 (e.g., adders, subtractors, multipliers and/or dividers, etc.), using arithmetic defined on $GF(q^m)$, modulo the primitive polynomial. The N evaluations generate N result values, each an element of $GF(q^m)$.

Continuing to block 270, the distributor 103 generates N shares of the secret, with each share including one of the evaluation points and the corresponding result value. The distributor 103 then distributes the N shares to the recipients 101 and the method 200 terminates.

It is understood that the above operations may follow a different sequence from what is shown in FIG. 2. For example, the splitting polynomial may be constructed after the selection of the primitive polynomial.

In one embodiment, the computation performed by the above-described secret sharing technique uses arithmetic defined on $GF(q^m)$, which involves modular arithmetic over small primes. That is, polynomial operations are performed on numbers in the range of $(0, q-1)$ to generate a result less than q. Addition in $GF(q^m)$ is defined as the term-by-term sum of the polynomial representation of the elements of $GF(q^m)$, using the rules for addition in $GF(q)$. Multiplication in $GF(q^m)$ is defined as performing polynomial multiplication, where multiplication and addition on a term-by-term basis are as defined for $GF(q)$, and then reducing the resulting polynomial to its remainder modulo the primitive polynomial that generates the polynomial basis for $GF(q^m)$. It is not necessary to keep track of the carries during the computation, as the addition of two corresponding polynomial terms (the same degree terms) generates no carry to a term of a higher degree (that is, the addition of the constant terms does not carry over to the $1^{st}$ degree term, the addition of the $1^{st}$ degree terms does not carry over to the $2^{nd}$ degree terms, etc.). As a result, the computation can be efficiently run on constrained hardware (e.g., an embedded microcontroller), where at least some of the computation is handled by software. Software on the constrained hardware can be programmed to efficiently handle the computation of the polynomials, which involves single precision integer arithmetic over integers of a small size (limited by the size of q). If the embedded system is provided with sufficient memory (e.g., read-only memory) and the size of the base prime q is small, polynomial multiplications can be implemented with table lookups. For example, if q is 37, the lookup table size would be 37 by 37 (=1369).

The polynomial operations defined on $GF(q^m)$ can also be efficiently implemented in array processors for parallel processing. For example, multiplication of two polynomials can be implemented by processing elements of an array processor, each holding one coefficient of a first polynomial. Each time a processing element receives a coefficient of a second polynomial, it performs a multiply-and-add operation over small integers. A person of ordinary skill in the art would appreciate that other embodiments may exist for processing arithmetic operations defined on $GF(q^m)$.

Figure 3:
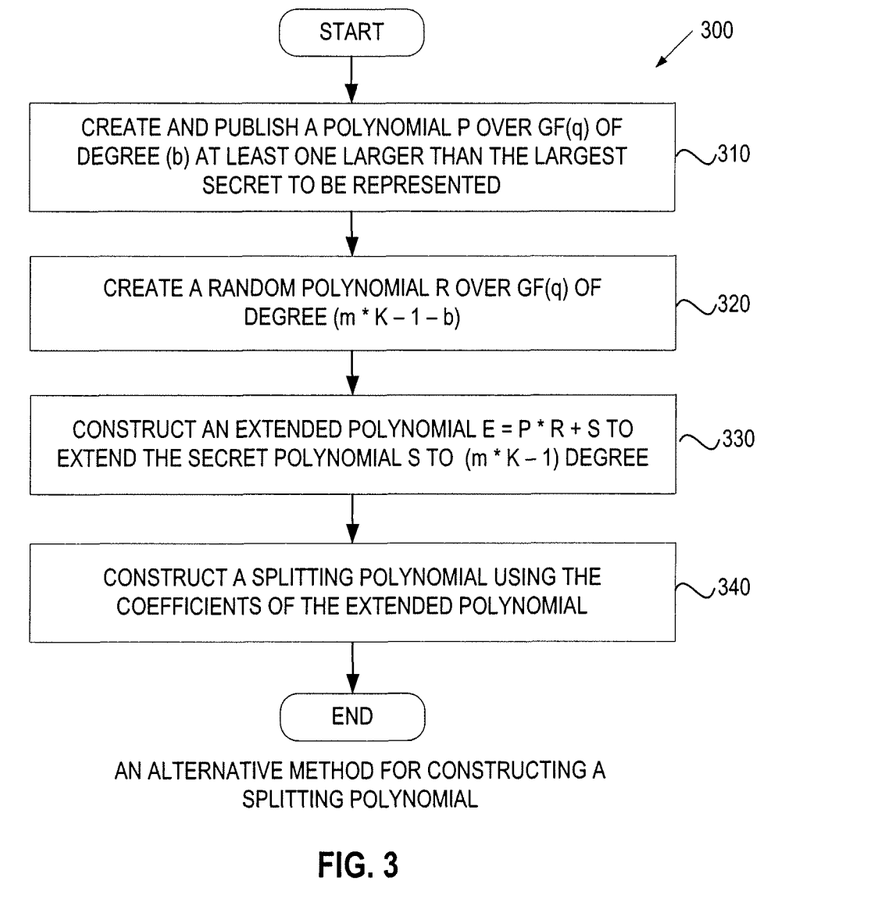
FIG. 3 is a flow diagram of an embodiment of a method for construction a splitting polynomial for secret sharing.

FIG. 3 illustrates a flow diagram of a method 300 for constructing a splitting polynomial, which is an alternative embodiment to the method 200 described at block 240 of FIG. 2. The method 300 may be performed by the processing logic 526 of FIG. 5 that may comprise hardware (e.g., circuitry, dedicated logic, programmable logic, microcode, etc.), software (such as instructions on a computer readable storage medium executable by a processing device), or a combination thereof. In one embodiment, the method 300 is performed by the second polynomial constructor 132 of the distributor 103 of FIG. 1.

At block 310, the second polynomial constructor 132 of the distributor 103 creates and publishes a polynomial P over $GF(q)$ of degree b, where b is at least one greater than the largest secret to be represented. At block 320, the second polynomial constructor 132 creates a random polynomial over $GF(q)$ of degree $(m*K-1-d)$. The polynomials P and R may or may not be coprime, and may or may not be irreducible. At block 330, the second polynomial constructor 132 constructs an extended polynomial E as $P*R+S$ (where S is the secret polynomial), modulo the primitive polynomial, using arithmetic defined on $GF(q^m)$. The extended polynomial E is a polynomial over $GF(q)$ with degree $(m*K-1)$. At block 340, the second polynomial constructor 132 construct a splitting polynomial over $GF(q^m)$ of degree $(K-1)$, using the $(m*K)$ coefficients of the extended polynomial. In one embodiment, the $(m*K)$ coefficients of the extended polynomial can be divided among the K terms of the splitting polynomial, such that each term gets one or more coefficients of the extended polynomial. For example, the coefficients of the extended polynomial can be evenly divided among the K terms of the splitting polynomial, such that each term gets m elements of $GF(q)$. In the embodiment of FIG. 3, random information is incorporated into the extended polynomial, instead of directly used as individual coefficients of the splitting polynomial (as described at block 240 of FIG. 2). The method 300 then terminates.

Figure 4:
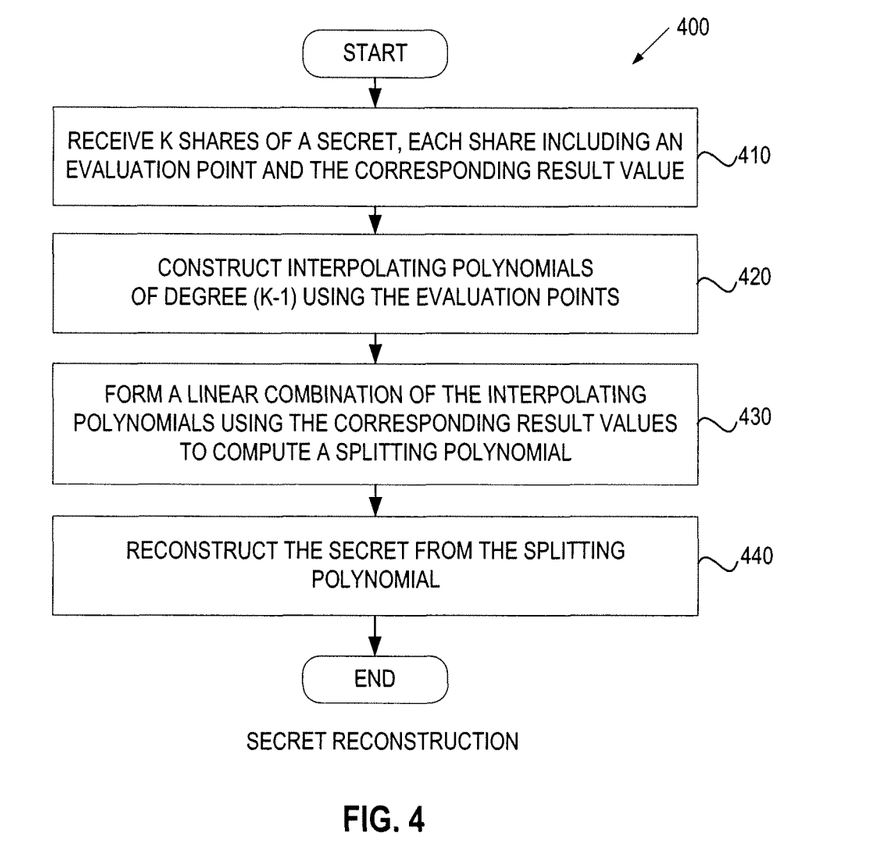
FIG. 4 is a flow diagram of a secret reconstruction method according to one embodiment of the present invention.

Having described the techniques for share generation, the following descriptions explain, in detail, an embodiment of the technique for reconstructing the secret from K of the N distributed shares. FIG. 4 illustrates a flow diagram of an embodiment of a method 400 for reconstructing the secret from a subset of the distributed shares. The method 400 may be performed by the processing logic 526 of FIG. 5 that may comprise hardware (e.g., circuitry, dedicated logic, programmable logic, microcode, etc.), software (such as instructions on a computer readable storage medium executable by a processing device), or a combination thereof. In one embodiment, the method 400 is performed by the reconstructor 104 of FIG. 1.

Referring to FIG. 4, at block 410, the receiving interface 141 of the reconstructor 140 receives K shares of the secret, each of the K shares including a pair of values $(x, y)$, where x is an evaluation point and y is the corresponding result value, as described above with reference to FIG. 2. At block 420, the interpolating unit 142 of the reconstructor 140 constructs K interpolating polynomials (e.g., Lagrange form basis polynomials) to interpolate the K pairs of $(x, y)$. Each interpolating polynomial is a polynomial over $GF(q^m)$ of degree $(K-1)$. The construction of the interpolating polynomials is performed using arithmetic defined on $GF(q^m)$, modulo the primitive polynomial. As will be illustrated in an example below, the construction of the interpolating polynomials uses the K evaluation points. At block 430, the interpolating unit 142 computes a linear combination of the interpolating polynomials using the K result values. The result of the linear combination is the splitting polynomial used for secret sharing. At block 440, the extraction unit 143 of the reconstructor 104 extracts the secret from one or more of the coefficients of the splitting polynomial and the method 400 terminates.

As an example, assume that $K=2$, and the K shares of the secrets are $(x_0, y_0)$ and $(x_1, y_1)$. Two Lagrange form basis polynomials are constructed as: $L_0(x)=(x-x_1)/(x_0-x_1)$ and $L_1(x)=(x-x_0)/(x_1-x_0)$, and the linear combination of the two polynomials is: $y_0 L_0(x)+y_1 L_1(x)$. The construction of Lagrange form basis polynomials is known in the art, so details of the construction in a generalized format are not described herein. It is understood that the interpolation of the points described above can be performed by alternative techniques, such as Newton polynomials, Chebyshev polynomials, Berstein polynomials, a system of linear equations, or other techniques commonly known in the field of numerical analysis.

The following description illustrates an example of the secret sharing and reconstruction technique described above. In this example, the number of generated shares N=4, and the number of shares for secret reconstruction K=3. The secret to be shared is 8675309 (decimal), which can be converted into a secret polynomial $12x^3+27x^2+20x+34$ over GF(89). A splitting polynomial is constructed as a polynomial over the field $GF(89^5)$. The field is chosen such that the order of the field $(89^5)$ is greater than the size of the secret. A primitive polynomial, which generates the field, is chosen to be $x^5+74x+86$.

To share this secret such that three shares are required to reconstruct it, the degree of the splitting polynomial is chosen to be 2 (=K−1). That is, the splitting polynomial has three coefficients. Using the secret polynomial as one of the coefficients, two additional elements of $GF(89^5)$ are needed to construct the splitting polynomial. These two additional elements can be generated as random elements of $GF(89^5)$, or equivalently, polynomials over GF(89) of degree 4 or less and having random coefficients in GF(89). For example, the two coefficients may be: $74x^4+66x^3+11x^2+21x+28$ and $25x^4+34x+55x^2+61x+12$. It is understood that the alternative embodiment of FIG. 3 may also be used to generate the splitting polynomial.

Using the three coefficients, a splitting polynomial can be constructed as:

$$S(Y)=(74x^4+66x^3+11x^2+21x+28)Y^2+(25x^4+34x^3+55X^2+61x+12)Y+(12x^3+27x^2+20x+34).$$

To generate four shares, four random non-zero elements of $GF(89^5)$ are generated as evaluation points, at which the splitting polynomial S(Y) is evaluated. The following elements $(x_1, x_2, x_3, x_4)$ are used as an example: $87x^4+23x^3+62x^2+79x+52$, $3x^4+60x^3+3x^2+18x+13$, $76x^4+74x^3+79x+24x+68$, and $50x^4+8x^3+16x^2+7x+73$.

Evaluating S(Y) at each of these elements of $GF(89^5)$ produces four result values $(y_1, y_2, y_3, y_4)$. Each evaluating point and its corresponding result value form a share. Thus, the following four shares are generated:

$1^{st}$ share $(x_1,y_1)$: $(87x^4+23x^3+62x^2+79x+52, 79x^4+76x^3+47x^2+35x+77)$, $2^{nd}$ share $(x_2,y_2)$: $(3x^4+60x^3+3x^2+18x+13, 58x^4+63x^3+39x^2+29x+34)$, $3^{rd}$ share $(x_3,y_3)$: $(76x^4+74x^3+79X^2+24x+68, 5x^4+51x^3+57x^2+16x+31)$, and $4^{th}$ share $(x_4,y_4)$: $(50x^4+8x^3+16x^2+7x+73, 66x^4+26x^3+15x^2+63x+16)$.

To reconstruct the secret, three shares are collected (e.g., the first three shares). First, the Lagrange basis polynomials are constructed (where "*" indicates multiplication):

$$L_1(Y) = (Y - (3x^4 + 60x^3 + 3x^2 + 18x + 13))*$$
$$(Y - (76x^4 + 74x^3 + 79x^2 + 24x + 68))*$$
$$(87x^4 + 23x^3 + 62x^2 + 79x + 52 -$$
$$(3x^4 + 60x^3 + 3x^2 + 18x + 13))^{-1}*$$
$$(87x^4 + 23x^3 + 62x^2 + 79x + 52 -$$
$$(76x^4 + 74x^3 + 79x^2 + 24x + 68))^{-1}$$
$$= (48x^4 + 51x^3 + 40x^2 + 84x + 4)Y^2 +$$
$$(24x^4 + 34x^3 + 80x^2 + 63x + 7)Y +$$
$$(43x^4 + 63x^3 + 29x^2 + 51x + 1),$$

Similarly, $L_2(Y)=(73x^4+85x^3+5x^2+60x+84)Y^2+(53x^4+33x^3+26X^2+26x+26)Y+(50x^4+75x^3+23x^2+85x)$, and $$L_3(Y)=(57x^4+42x^3+44X^2+34x+1)Y^2+(12x^4+22x^3+72X^2+56)Y+(85x^4+40x^3+37x^2+42x).$$

These basis polynomials are then multiplied by their corresponding result values to produce:

$$y_1*L_1(Y)=(8x^4+29x^3+53x^2+34x+4)Y^2+(84x^4+13x^3+44x^2+76x+84)Y+(23x^4+72x^3+27x^2+41x+45),$$

$$y_2*L_2(Y)=(52x^4+52x^3+63x^2+58x+10)Y^2+(74x^4+74x^3+70x^2+15x+15)Y+(49x^4+17x^3+11x^2+81x+44), \text{ and}$$

$$y_3*L_3(Y)=(14x^4+74x^3+73x^2+18x+14)Y^2+(45x^4+36x^3+30X^2+59x+2)Y+(17x^4+12x^3+78x^2+76x+34).$$

These polynomials are then added to yield: $y_1*L_1(Y)+y_2*L_2(Y)+y_3*L_3(Y)=(74x^4+66x^3+11x^2+21x+28)Y^2+(25x^4+34x^3+55x^2+61x+12)Y+(12x^3+27x^2+20x+34)==S(Y)$, which is the splitting polynomial. In this example, the secret polynomial can be extracted from the constant term, which is $12x^3+27x^2+20x+34$. Evaluating the secret polynomial at 89 by using operations as defined on the integers yields the original secret, which is 8675309 in decimal representation.

Figure 5:
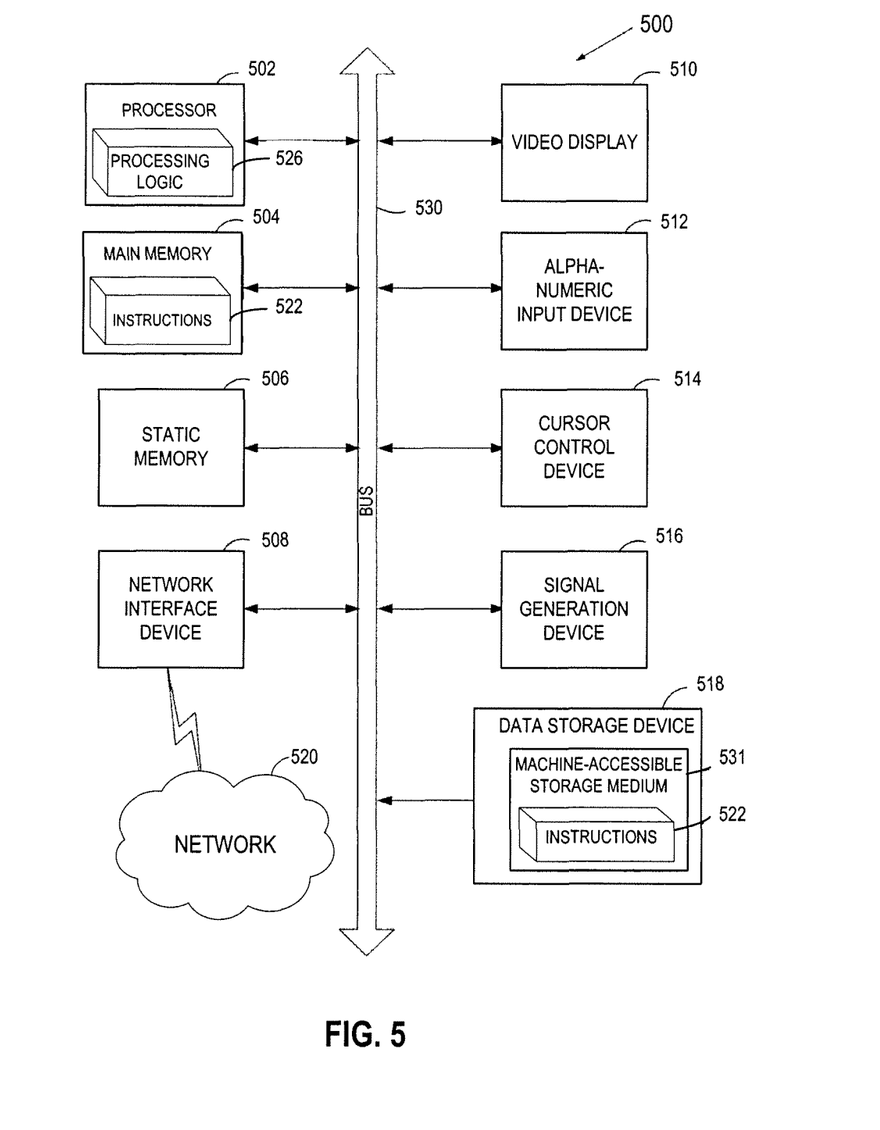
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the secret 106 of FIG. 1. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for sharing a secret using polynomials over polynomials have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
representing a secret as a secret polynomial over GF(q), wherein q is a prime number or a power of a prime number;
constructing, by a processing device, a splitting polynomial over $GF(q^m)$, with coefficients formed by the secret polynomial and random information, wherein the splitting polynomial has a degree equal to one less than a first number of shares necessary to reconstruct the secret and m is a positive integer; and
generating a second number of shares of the secret for distribution among cooperating entities by evaluating the splitting polynomial at a second number of points with arithmetic defined on $GF(q^m)$, wherein the second number of shares is equal to the second number of points.

2. The method of claim 1, wherein generating the second number of shares of the secret further comprises:
generating the second number of shares of the secret, with each of the second number of shares including a non-zero random element of $GF(q^m)$, at which the splitting polynomial is evaluated, and a corresponding result value.

3. The method of claim 1, wherein constructing a splitting polynomial further comprises:
using a representation of the secret polynomial as one of the coefficients of the splitting polynomial; and
generating random elements of $GF(q^m)$ as other coefficients of the splitting polynomial.

4. The method of claim 1, wherein constructing a splitting polynomial further comprises:
splitting coefficients of the secret polynomial into a plurality of groups, with each group forming one of the coefficients of the splitting polynomial; and
generating random elements of $GF(q^m)$ as other coefficients of the splitting polynomial.

5. The method of claim 1, wherein constructing a splitting polynomial further comprises:
extending the secret polynomial to an extended polynomial of a higher degree; and
splitting coefficients of the extended polynomial into a plurality of groups, with each group forming one of the coefficients of the splitting polynomial.

6. The method of claim 1, wherein constructing a splitting polynomial further comprises: further comprises:
creating and publishing a first random polynomial over GF(q) of degree b at least one larger than the secret;
creating a second random polynomial over GF(q) of degree (m*K−1−b), wherein K is equal to the first number of shares;
adding the secret polynomial to a product of the first random polynomial and the second random polynomial to generate an extended polynomial of degree (m*K−1); and
using coefficients of the extended polynomial as the coefficients of the splitting polynomial.

7. The method of claim 1, further comprising:
determining a primitive polynomial with degree m and coefficients in GF(q); and
computing the second number of shares of the secret using arithmetic defined on $GF(q^m)$, modulo the primitive polynomial.

8. A system comprising:
data storage to store a secret; and
a processing device coupled to the data storage, the processing device configured to:

construct a secret polynomial over GF(q) from the secret, wherein q is a prime number or a power of a prime number;

construct a splitting polynomial over $GF(q^m)$, with coefficients formed by the secret polynomial and random information, wherein the splitting polynomial has a degree equal to one less than a first number of shares necessary to reconstruct the secret and m is a positive integer; and generating a second number of shares of the secret for distribution among cooperating entities by evaluating the splitting polynomial at a second number of points with arithmetic defined on $GF(q^m)$, wherein the second number of shares is equal to the second number of points.

9. The system of claim 8, wherein the processing device includes multipliers and adders to evaluate the splitting polynomial at a first number of non-zero random element of $GF(q^m)$ and to generate a first number of corresponding result values.

10. The system of claim 8, wherein the processing device is further configured to use a representation of the secret polynomial as one or more of the coefficients of the splitting polynomial and to generate random elements of $GF(q^m)$ as other coefficients of the splitting polynomial.

11. The system of claim 8, wherein the processing device is further configured to extend the secret polynomial to an extended polynomial of a higher degree and to split coefficients of the extended polynomial into a plurality of groups, with each group forming one of the coefficients of the splitting polynomial.

12. A non-transitory computer readable storage medium including instructions that, when executed by a processing device, cause the processing device to perform a method comprising:

representing a secret as a secret polynomial over GF(q), wherein q is a prime number or a power of a prime number;

constructing, by the processing device, a splitting polynomial over $GF(q^m)$, with coefficients formed by the secret polynomial and random information, wherein the splitting polynomial has a degree equal to one less than a first number of shares necessary to reconstruct the secret and m is a positive integer; and generating a second number of shares of the secret for distribution among cooperating entities by evaluating the splitting polynomial at a second number of points with arithmetic defined on $GF(q^m)$, wherein the second number of shares is equal to the second number of points.

13. The non-transitory computer readable medium of claim 12, wherein generating the second number of shares of the secret further comprises:

generating the second number of shares of the secret, with each of the second number of shares including a non-zero random element of $GF(q^m)$, at which the splitting polynomial is evaluated, and a corresponding result value.

14. The non-transitory computer readable medium of claim 12, wherein constructing a splitting polynomial further comprises:

using a representation of the secret polynomial as one or more of the coefficients of the splitting polynomial; and generating random elements of $GF(q^m)$ as other coefficients of the splitting polynomial.

15. The non-transitory computer readable medium of claim 12, wherein constructing a splitting polynomial further comprises:

extending the secret polynomial to an extended polynomial of a higher degree; and splitting coefficients of the extended polynomial into a plurality of groups, with each group forming one of the coefficients of the splitting polynomial.

16. The non-transitory computer readable medium of claim 12, wherein constructing a splitting polynomial further comprises:

creating and publishing a first random polynomial over GF(q) of degree b at least one larger than the secret;

creating a second random polynomial over GF(q) of degree (m*K−1−b), wherein K is equal to the first number of shares;

adding the secret polynomial to a product of the first random polynomial and the second random polynomial to generate an extended polynomial of degree (m*K−1); and using coefficients of the extended polynomial as the coefficients of the splitting polynomial.

* * * * *